United States Patent [19]

Sato et al.

[11] Patent Number: 5,316,716
[45] Date of Patent: May 31, 1994

[54] MOLD RELEASING RESIN COMPOSITION AND MOLDING OF CURABLE RESIN USING THE SAME

[75] Inventors: Shinichi Sato; Morio Oohasi; Hiroshi Inomata, all of Annaka, Japan

[73] Assignee: Shin-Etsu Chemical Co., Ltd., Tokyo, Japan

[21] Appl. No.: 897,385

[22] Filed: Jun. 12, 1992

[30] Foreign Application Priority Data

Jun. 12, 1991 [JP] Japan ................................. 3-168856

[51] Int. Cl.$^5$ ..................... B29C 33/58; B29C 33/64
[52] U.S. Cl. .................... 264/338; 106/38.22; 106/38.6; 264/300; 528/25
[58] Field of Search ............... 106/38.2, 38.22, 38.3, 106/38.6, 38.24; 264/130, 338, 300; 528/25, 24

[56] References Cited

U.S. PATENT DOCUMENTS

| | | | |
|---|---|---|---|
| 2,811,408 | 10/1957 | Braley | 264/338 |
| 3,186,964 | 6/1965 | Kookootsedes et al. | 264/338 |
| 3,341,646 | 9/1967 | Britain | 264/338 |
| 3,406,236 | 10/1968 | Kniege | 264/338 |
| 3,492,394 | 1/1970 | Heine | 264/338 |
| 3,525,783 | 8/1970 | Prikkel, III | 264/338 |
| 3,624,190 | 11/1971 | Cekada, Jr. | 264/338 |
| 3,671,007 | 6/1972 | Bailey et al. | 264/338 |
| 3,887,628 | 5/1975 | Martin | 264/338 |
| 4,184,880 | 1/1980 | Huber et al. | 106/38.24 |
| 4,222,951 | 9/1980 | Kreis et al. | |
| 4,244,912 | 1/1981 | Battice | 264/338 |
| 4,736,048 | 4/1988 | Brown et al. | |
| 4,840,675 | 6/1989 | Fukui et al. | 264/338 |
| 5,152,950 | 10/1992 | Ona et al. | 264/338 |

FOREIGN PATENT DOCUMENTS

177647  4/1986  European Pat. Off. ............ 264/338

Primary Examiner—Jeffery Thurlow
Assistant Examiner—Mathieu Vargot
Attorney, Agent, or Firm—Birch, Stewart Kolasch & Birch

[57] ABSTRACT

A mold releasing resin composition is provided which contains at least one fluorinated compound end-blocked with a dimethylhydrogensiloxane group and optionally having a fluorinated polyether linkage. The composition is applied to the inner surface of a silicone rubber mold and cured thereat before a curable resin is admitted into the mold, cured therein, and then removed from the mold.

20 Claims, No Drawings

MOLD RELEASING RESIN COMPOSITION AND MOLDING OF CURABLE RESIN USING THE SAME

This invention relates to a mold releasing resin composition to be applied to silicone rubber molds and a process for molding a curable resin using the same.

BACKGROUND OF THE INVENTION

The fabrication of molded articles by admitting molding materials such as urethane resin, epoxy resin, polyester resin and so forth into molds of silicone rubber followed by curing is now of widespread use covering from the manufacture and reproduction of artistic handicrafts to the fabrication technique of industrial plastic articles which is also known as a vacuum casting technique. It is a common practice to apply a mold release agent to the inner surface of a silicone rubber mold before admission of resinous material into the mold in order to prevent the resinous material from sticking to the mold for increasing the number of molding cycles permissible for the mold. The commonly used mold release agents include silicone oil, modified silicone oil, wax and paint. However, some of these mold release agents can cause the silicone rubber to swell, some can poorly wet the silicone rubber mold surface, and some are less satisfactory in the retention of their mold releasability.

SUMMARY OF THE INVENTION

Therefore, an object of the present invention is to provide a mold releasing resin composition adapted for molds of silicone rubber. Another object of the present invention is to provide a curable resin molding process using the resin composition as a mold release agent to be applied to silicone rubber molds.

The above and other objects and advantages are accomplished in accordance with a first aspect of the present invention by providing a resin composition comprising a compound of the following formula (1) and/or a compound of the following formula (2).

$$(HSiO)_{3-a}\underset{\underset{CH_3}{|}}{\overset{\overset{CH_3}{|}}{Si}}CH_2CH_2-CF(OCF_2CF)_{\overline{n}}OCF_2CF_2O- \quad (1)$$
$$\overset{(CH_3)_a}{} \quad \overset{CF_3}{} \quad \overset{CF_3}{}$$

$$-(CFCF_2O)_m\underset{\underset{CF_3}{|}}{\overset{\overset{CF_3}{|}}{CF}}CH_2CH_2\underset{\underset{CH_3}{|}}{\overset{\overset{(CH_3)_a}{|}}{Si}}-(OSiH)_{3-a}$$
$$\overset{CH_3}{}$$

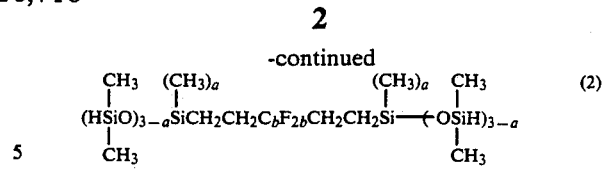

Letter a is an integer of from 0 to 2, n and m are integers meeting n+m=0 to 8, and b is an integer of from 4 to 12. The resin composition possesses good properties relative to silicone rubber. With the composition applied and cured to a silicone rubber mold, the mold exhibits improved parting properties.

More particularly, when the resin composition is applied and cured to the inner surface of a silicone rubber mold, the resin composition does not cause the silicone rubber to swell, and has improved wettability to the silicone rubber mold surface. In the molding of a curable resin involving admission of the resin into the mold, curing of the resin, and removal of the cured resin from the mold, the resin composition on the mold inner surface allows the cured resin to smoothly part from the mold inner surface. The resin composition can last over a number of molding cycles.

In accordance with a second aspect of the present invention, a curable resin is molded by applying the resin composition defined above to the inner surface of a silicone rubber mold, curing the composition thereat, admitting a curable resin into the mold, causing the resin to cure in the mold, and removing the cured resin from the mold.

DETAILED DESCRIPTION OF THE INVENTION

The mold releasing resin composition of the present invention contains at least one member selected from compounds of formulae (1) and (2).

Formula (1):

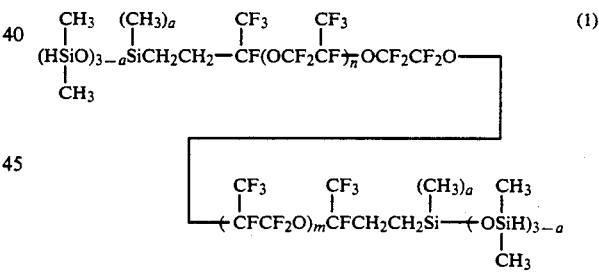

The compound of formula (1) is prepared by starting with an oligomer having a hexafluoropropeneoxide group (the oligomer is abbreviated as HFPO, hereinafter) and synthesizing a compound of formula (3) therefrom in accordance with the following scheme.

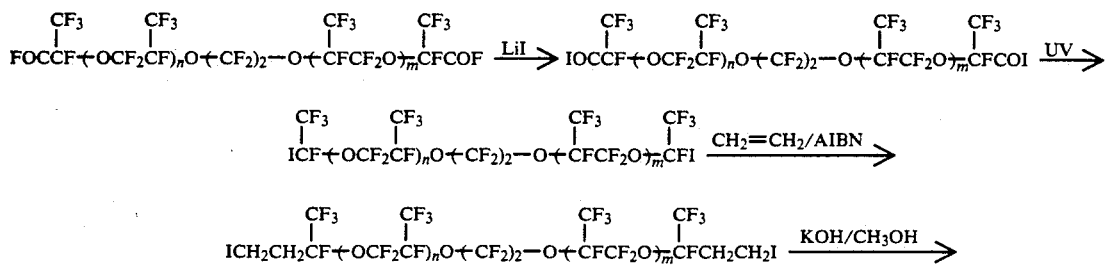

-continued

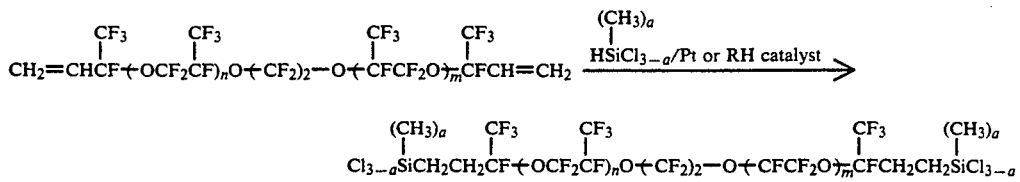

(3)

The compound of formula (3) is then subject to cohydrolysis with a compound of the following formula (4) in a hydrochloric acid acidic condition, thus synthesizing a compound of formula (1) having a fluorinated polyether linkage in high yields.

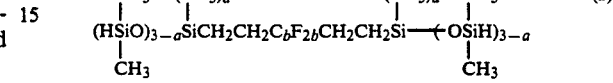

(2)

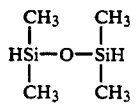

(4)

The compound of formula (1) is a low viscous liquid. The starting material or HFPO has a degree of polymerization, corresponding to (n+m) in formula (1), of 0 to 8, especially 2 to 6. If HFPO has a degree of polymerization in excess of 8, the compound of formula (1) synthesized therefrom becomes less compatible with dimethylsilicone oil to be described later. In formula (1), a is an integer of from 0 to 2. Compounds of formula (1) wherein a=0, that is, having 6 SiH groups are more advantageous in bonding reaction to the silicone rubber surface and result in cured products having better release property.

Formula (2):

The compound of formula (2) may also be synthesized by well-known techniques. In formula (2), a is as defined for formula (1), and b is an integer of from 4 to 12, especially 6 to 10.

Several illustrative examples of the compounds of formulae (1) and (2) are given below. They may be used alone or in admixture of two or more.

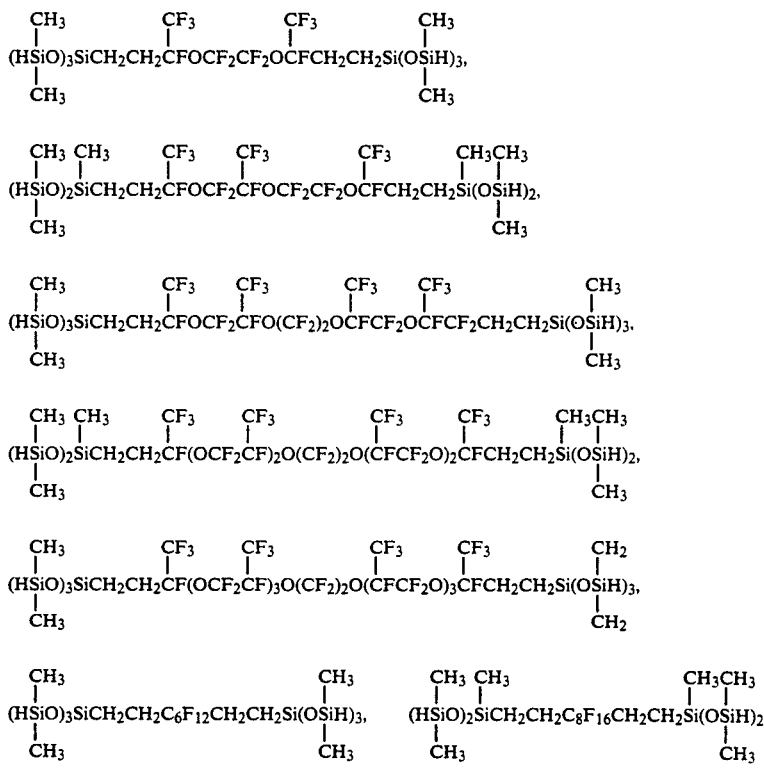

The above-defined compounds as such may be used as mold release resin compositions of the present invention. Preferably, the compounds are blended with dimethylsilicone oil having a viscosity of at least 1,000 centistokes (cs) at 25° C., more preferably 5,000 to 1,000,000 cs at 25° C. for the purpose of forming a more uniform coating on the surface of silicone rubber molds. This dimethylsilicone oil may be selected from conventional dimethylsilicone oils as represented by the following formula, for example, KF-96 commercially available from Shin-Etsu Chemical Co., Ltd.

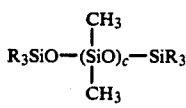

wherein R is methyl, vinyl, hydroxyl or hydrogen, with the methyl group being fully effective, and c is a sufficient number to provide a viscosity of at least 1,000 cs at 25° C.

Also preferably, in the mold release resin composition of the present invention, there is further blended a silicone varnish obtained by dissolving in an organic solvent a methyl series silicone comprising siloxane units selected from $CH_3SiO_{3/2}$, $(CH_3)SiO$, $CH_2=CHSiO_{3/2}$, and $(CH_2=CH)CH_3SiO$ units and having a trifunctional siloxane unit as an essential component. Such methyl series silicone varnish is commercially available as KR251, KR252 and KR253 from Shin-Etsu Chemical Co., Ltd.

Further preferably, a base catalyst is blended in the mold release resin composition of the present invention for the purpose of promoting film formation of the present composition and promoting curing of a curable resin which is introduced into the mold coated with the present composition. Examples of the base catalyst include hydroxides, alkoxides and silanolates of alkali metals, quaternary ammonium salts, phosphonium salts and silanolates thereof, amines, imidazoles, and nitrogenous base compounds such as DBU. The base catalyst is preferably added in an amount of about 1 to 1,000 ppm in the mold release resin composition. Excess amounts of the base catalyst can cause the silicone rubber mold to crack.

The mold release resin composition of the invention may be used by applying it to molds in a solvent-free state. However, solventless systems often form too thick or non-uniform coatings. It is thus preferred to dissolve the composition in an organic solvent prior to application. Preferred are those organic solvents in which the composition is well soluble and which fully wet the silicone rubber surface and volatilize off quickly. Exemplary solvents are aliphatic hydrocarbons such as n-hexane, n-heptane, and n-octane; ethers such as ethyl ether, propyl ether, and butyl ether; ketones such as acetone and methyl ethyl ketone; esters such as ethyl acetate; alcohols such as ethyl alcohol and propyl alcohol, and halogenated solvents such as dichloromethane, tetrachloroethane, and trichlorotrifluoroethane. Preferred are n-hexane and trichlorotrifluoroethane.

The composition may be applied to the silicone rubber mold by brush coating, spraying and other conventional coating techniques. In either case, after application, the coating is air dried and/or heat dried at about 50° to 150° C., preferably about 60° to 100° C. for about 0.1 to 5 hours, preferably about 1 to 3 hours until the solvent is volatilized off. Then the coating, more exactly coated mold is ready for use.

The molding materials which can be molded in the coated silicone rubber mold are curable resins including urethane resins, epoxy resins, and polyester resins. After the curable resin is admitted into the mold cavity, it is cured at appropriate temperature. Thereafter, a molded product can be smoothly removed from the mold.

EXAMPLE

Examples of the present invention are given below by way of illustration and not by way of limitation.

EXAMPLES 1-3 & COMPARATIVE EXAMPLE 1

Silicone rubber molds were prepared by applying silicone rubber (KE-1300 manufactured by Shin-Etsu Chemical Co., Ltd.) on a stainless steel block of 50×50×5 mm. The molds on the inner surface were coated with the following fluorinated hydrogen siloxanes A, B and C, respectively, which were cured by heat treatment at 60° C. for 3 hours.

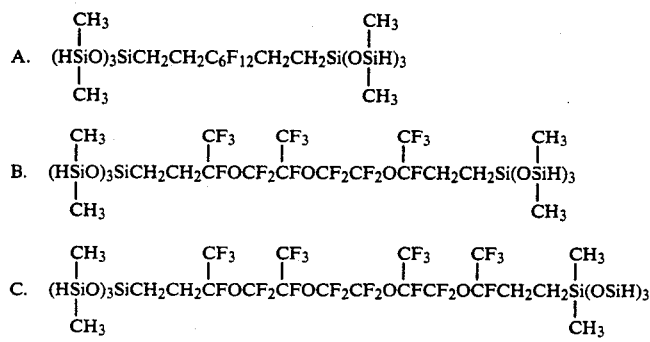

Urethane resin (3075, manufactured by H & K K.K.) was introduced into each coated mold, cured at 60° C. for 1 hour, and then removed from the mold. This molding cycle was repeated for determining how the coated mold retained releasability. The coating and curing of the fluorinated hydrogen siloxane to the mold was repeated every three cycles of urethane resin molding.

The cured resin as removed from the mold was measured for surface gloss using a gloss meter (manufactured by Murakami Color Research K.K.). The results are shown in Table 1.

For comparison purposes, the molding cycle was carried out using the same silicone rubber mold as above without coating the fluorinated siloxane. Releasability retention and surface gloss were measured. The results are also shown in Table 1.

TABLE 1

|  | Example | | | Comparative |
|---|---|---|---|---|
|  | 1 | 2 | 3 | Example 1 |
| Coating | A | B | C | none |
| Number of moldings | 18 | ≧20 | ≧20 | 15 |
| Ease of removal | light | light | very light | — |
| Surface gloss of cured resin, % | | | | |
| 1st | 96 | 91 | 95 | 92 |

TABLE 1-continued

|  | Example 1 | Example 2 | Example 3 | Comparative Example 1 |
| --- | --- | --- | --- | --- |
| 5th | 88 | 71 | 80 | 68 |
| 10th | 61 | 68 | 51 | 30 |
| 15th | 22 | 42 | 21 | 2 |
| 20th | — | 6 | 3 | — |

EXAMPLES 4 & 5

Silicone rubber molds similar to Example 1 were prepared from silicone rubber (KE 1300T, Shin-Etsu Chemical Co., Ltd.). Coating D and E of the composition shown in Table 2 were applied to the molds. Molding of urethane resin was carried out as in Example 1 for determining releasability retention and surface gloss. The results are shown in Table 3.

TABLE 2

| Coating (pbw) | D | E |
| --- | --- | --- |
| Compound B | 0.20 | 0.20 |
| KF-96*[1] | 0.75 | 0.75 |
| KR-251*[2] | 0.05 | 0.05 |
| K-siliconate*[3] | — | 0.02 |
| n-butyl ether | 5 | 5 |
| n-hexane | 94 | 94 |

*[1] viscosity 10,000 cs, manufactured by Shin-Etsu Chemical Co., Ltd.
*[2] 20% methyl silicone varnish, manufactured by Shin-Etsu Chemical Co., Ltd.
*[3] 3% KOH dimethylsiloconate

TABLE 3

|  | Example 4 | Example 5 |
| --- | --- | --- |
| Coating | D | E |
| Number of moldings | 18 | 20 |
| Ease of removal | light | light |
| Surface gloss of cured resin, % | | |
| 1st | 91 | 92 |
| 5th | 75 | 67 |
| 10th | 64 | 48 |
| 15th | 36 | 39 |
| 20th | — | 11 |

There has been described a mold releasing resin composition which when applied to silicone rubber molds as a release agent, shows not only high releasability in that it allows for light removal of cured resins from molds, even from large size molds, but also remains releasable in that it withstands repeated molding procedures, for example, about 30% more in number of molding cycles than the prior art. There are molded products having improved gloss.

Although some preferred embodiments have been described, many modifications and variations may be made thereto in the light of the above teachings. It is therefore to be understood that within the scope of the appended claims, the invention may be practiced otherwise than as specifically described.

We claim:

1. A mold releasing composition comprising at least one compound represented by formula (1) or (2):

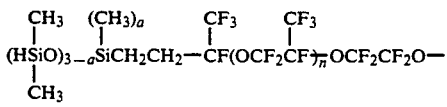

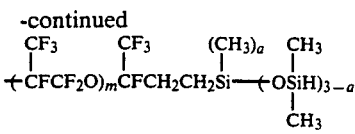

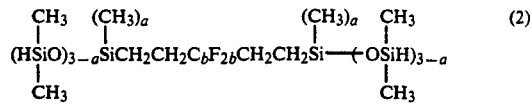

wherein letter a is an integer of from 0 to 2, n and m are integers meeting $n+m=0$ to 8, and b is an integer of from 4 to 12.

2. A process of molding a curable resin, comprising the steps of:

applying a composition comprising at least one compound represented by formula (1) or (2):

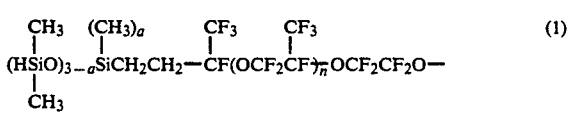

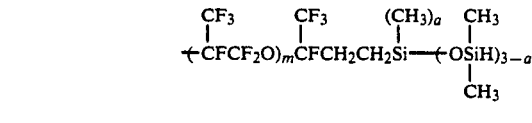

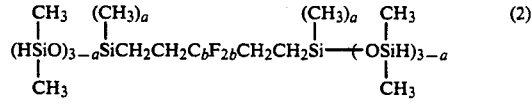

wherein letter a is an integer of from 0 to 2, n and m are integers meeting $n+m=0$ to 8, and b is an integer of from 4 to 12, to the inner surface of a silicone rubber mold,
curing the composition thereat,
admitting a curable resin into the mold,
causing the resin to cure in the mold, and
removing the cured resin from the mold.

3. The mold releasing composition according to claim 1, wherein said composition further comprises a dimethylsilicone oil having a viscosity of at least 1,000 centistokes at 25° C.

4. The mold releasing composition according to claim 3, wherein said dimethylsilicone oil is represented by the formula:

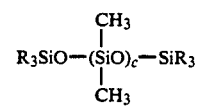

wherein R is a hydrogen, vinyl, hydroxyl, or methyl group and c is a sufficiently large number so as to provide for a viscosity of at least 1,000 centistokes at 25° C.

5. The mold releasing composition according to claim 1, wherein said composition further comprises a silicone varnish obtained by dissolving a methyl series silicone which comprises a trifunctional siloxane unit as an essential component and siloxane units selected from the group consisting of $CH_3SiO_{3/2}$, $(CH_3)SiO$, $CH_2\!=\!CHSiO_{3/2}$, and $(CH_2\!=\!CH)CH_3SiO$ into an organic solvent.

6. The mold releasing composition according to claim 3, wherein said composition further comprises a silicone varnish obtained by dissolving a methyl series silicone which comprises a trifunctional siloxane unit as an essential component and siloxane units selected from the group consisting of $CH_3SiO_{3/2}$, $(CH_3)SiO$, $CH_2=CHSiO_{3/2}$, and $(CH_2=CH)CH_3SiO$ into an organic solvent.

7. The mold releasing composition according to claim 1, wherein said composition further comprises a base catalyst selected from the group consisting of hydroxides, alkoxides of alkali metals, silanolates of alkali metals, quaternary ammonium salts, phosphonium salts and silanolates thereof, amines, and imidazoles.

8. The mold releasing composition according to claim 3, wherein said composition further comprises a base catalyst selected from the group consisting of hydroxides, alkoxides of alkali metals, silanolates of alkali metals, quaternary ammonium salts, phosphonium salts and silanolates thereof, amines, and imidazoles.

9. The mold releasing composition according to claim 5, wherein said composition further comprises a base catalyst selected from the group consisting of hydroxides, alkoxides of alkali metals, silanolates of alkali metals, quaternary ammonium salts, phosphonium salts and silanolates thereof, amines, and imidazoles.

10. The mold releasing composition according to claim 6, wherein said composition further comprises a base catalyst selected from the group consisting of hydroxides, alkoxides of alkali metals, silanolates of alkali metals, quaternary ammonium salts, phosphonium salts and silanolates thereof, amines, and imidazoles.

11. The mold releasing composition according to claim 1, wherein a is 0, n+m=2 to 6, and b is an integer from 6 to 10.

12. The mold releasing resin composition according to claim 1, wherein said compound of formulae (1) or (2) is selected from the group consisting of

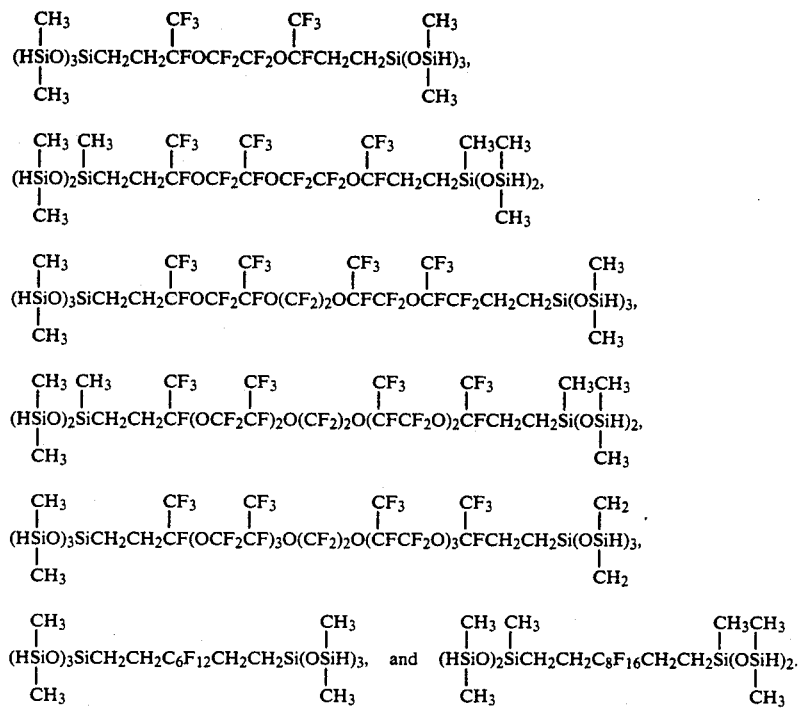

13. The mold releasing resin composition according to claim 10, wherein said compound of formulae (1) or (2) is selected from the group consisting of

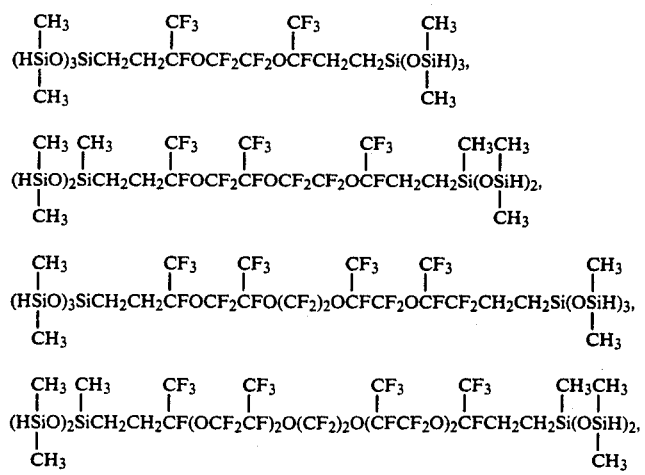

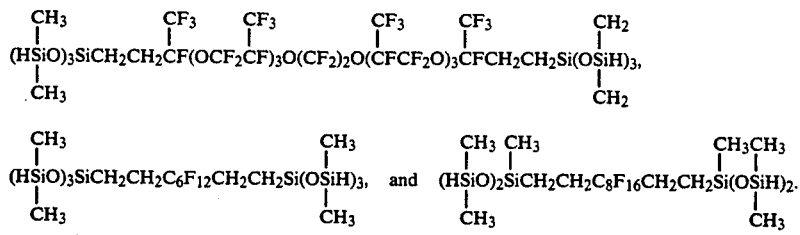

14. The mold releasing composition according to claim 1, wherein said composition further comprises an organic solvent.

15. The mold releasing composition according to claim 14, wherein said organic solvent is selected from aliphatic hydrocarbons, ethers, ketones, esters, alcohols, and halogenated solvents.

16. The mold releasing composition according to claim 14, wherein said organic solvent is n-hexane or trichlorotrifluoroethane.

17. The process according to claim 2, wherein said composition comprises an organic solvent.

18. The process according to claim 17, wherein said organic solvent is n-hexane or trichlorotrifluoroethane.

19. The process according to claim 17, wherein said curing step is carried out at a temperature of about 50° to 150° C. until said solvent is volatilized off.

20. The process according to claim 19, wherein said curing step is carried out at a temperature of about 60° to 100° C. for a duration of about 1 to 3 hours.

* * * * *